US009380539B2

(12) United States Patent
Kanamarlapudi et al.

(10) Patent No.: US 9,380,539 B2
(45) Date of Patent: Jun. 28, 2016

(54) TECHNIQUES FOR REDUCING TRANSMISSION DELAYS IN MULTI-CARRIER WIRELESS COMMUNICATIONS

(71) Applicant: QUALCOMM Incorporated, San Diego, CA (US)

(72) Inventors: Sitaramanjaneyulu Kanamarlapudi, San Diego, CA (US); Liangchi Hsu, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 0 days.

(21) Appl. No.: 14/579,828

(22) Filed: Dec. 22, 2014

(65) Prior Publication Data

US 2016/0007298 A1 Jan. 7, 2016

Related U.S. Application Data

(60) Provisional application No. 62/019,670, filed on Jul. 1, 2014.

(51) Int. Cl.
*H04B 7/00* (2006.01)
*H04W 52/16* (2009.01)
*H04W 52/58* (2009.01)
(Continued)

(52) U.S. Cl.
CPC ............ *H04W 52/16* (2013.01); *H04W 52/221* (2013.01); *H04W 52/50* (2013.01); *H04W 52/58* (2013.01); *H04W 56/001* (2013.01); *H04W 52/146* (2013.01); *H04W 88/08* (2013.01)

(58) Field of Classification Search
CPC ... H04W 52/04; H04W 52/08; H04W 52/146; H04W 52/16; H04W 52/40; H04W 52/50
USPC ......................................................... 455/522
See application file for complete search history.

(56) References Cited

U.S. PATENT DOCUMENTS 7,783,267 B1   8/2010   Harel et al.
8,700,084 B2   4/2014   Pelletier et al.
(Continued)

FOREIGN PATENT DOCUMENTS

CN   101860947 B   12/2012
EP   1 991 020 B1   4/2015
(Continued)

OTHER PUBLICATIONS

International Search Report and Written Opinion—PCT/US2015/037036—ISA/EPO—Sep. 1, 2015. (11 total pages).

*Primary Examiner* — Lee Nguyen
(74) *Attorney, Agent, or Firm* — Arent Fox LLP

(57) ABSTRACT

Aspects related to performing power control over a secondary carrier are described. At least one parameter can be received for performing power control over a carrier with a cell. Based on the at least one parameter, at least one alternative parameter can be determined for performing a power control procedure for a secondary carrier with the cell, and the power control procedure for the secondary carrier with the cell can be performed based at least in part on the at least one alternative parameter. The at least one alternative parameter may result in a power control procedure for the secondary carrier that takes less time than a power control procedure for the primary carrier with the cell.

26 Claims, 8 Drawing Sheets

(51) Int. Cl.
*H04W 56/00* (2009.01)
*H04W 52/22* (2009.01)
*H04W 52/50* (2009.01)
*H04B 15/00* (2006.01)
*H04W 88/08* (2009.01)
*H04W 52/14* (2009.01)

(56) References Cited

U.S. PATENT DOCUMENTS

2011/0038271 A1 2/2011 Shin et al.
2011/0292899 A1 12/2011 Yu et al.
2013/0272232 A1 10/2013 Dinan
2014/0064251 A1* 3/2014 Skov .................. H04J 11/0053
 370/331
2015/0223234 A1 8/2015 Seo et al.

FOREIGN PATENT DOCUMENTS

WO WO-2007/099701 A1 9/2007
WO WO-2014/038908 A1 3/2014

* cited by examiner

TECHNIQUES FOR REDUCING TRANSMISSION DELAYS IN MULTI-CARRIER WIRELESS COMMUNICATIONS

CLAIM OF PRIORITY UNDER 35 U.S.C. §119

The present application for patent claims priority to Provisional Application No. 62/019,670 entitled "TECHNIQUES FOR REDUCING TRANSMISSION DELAYS IN MULTI-CARRIER WIRELESS COMMUNICATIONS" filed Jul. 1, 2014, which is assigned to the assignee hereof and hereby expressly incorporated by reference herein.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. Other access technologies can include Global System for Mobile Communications (GSM), and/or derivatives thereof.

In some systems, when a device establishes a radio connection with a network, the device can be configured with parameters such as a power control preamble, signaling radio bearer delay, etc. for performing power control over the radio connection over a period of time. These parameters may be configured based on properties of the cell, distance or pathloss of the device to a base station providing the cell, etc. The devices abide by these parameters in subsequent transmissions to synchronize power in the network over the connection. Where a device communicating in a cell over a primary carrier configures a secondary carrier with the cell, the device may already be nearly synchronized with the cell based on a previous power control procedure when establishing the primary carrier. The device, however, is still required to abide by the power control parameters to synchronize the secondary carrier with the network as well. When devices frequently activate/deactivate secondary carriers and/or activate secondary carriers (e.g., to communicate a small payload of data, which can be based on considerations at the device such as data load at the device), this can cause burdensome delay.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of performing power control over a secondary carrier is described. The method includes receiving at least one parameter for performing power control over a primary carrier with a cell, determining, based on the at least one parameter, at least one alternative parameter for performing a power control procedure for a secondary carrier with the cell, and performing the power control procedure for the secondary carrier with the cell based at least in part on the at least one alternative parameter.

In another aspect, an apparatus for performing power control over a secondary carrier is described. The apparatus includes a power control parameter receiving component configured to receive at least one parameter for performing power control over a primary carrier with a cell, a parameter determining component configured to determine, based on the at least one parameter, at least one alternative parameter for performing a power control procedure for a secondary carrier with the cell, and a power control performing component configured to perform the power control procedure for the secondary carrier with the cell based at least in part on the at least one alternative parameter.

In yet another aspect, an apparatus for performing power control over a secondary carrier is described. The apparatus includes means for receiving at least one parameter for performing power control over a primary carrier with a cell, means for determining, based on the at least one parameter, at least one alternative parameter for performing a power control procedure for a secondary carrier with the cell, and means for performing the power control procedure for the secondary carrier with the cell based at least in part on the at least one alternative parameter.

In still a further aspect, a non-transitory computer-readable medium storing computer executable code for performing power control over a secondary carrier is described. The computer-readable medium includes code executable to receive at least one parameter for performing power control over a primary carrier with a cell, code executable to determine, based on the at least one parameter, at least one alternative parameter for performing a power control procedure for a secondary carrier with the cell, and code executable to perform the power control procedure for the secondary carrier with the cell based at least in part on the at least one alternative parameter.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various aspects related to modifying power control operations of a wireless device with a network when activating a carrier in a multi-carrier configuration. For example, at least one configuration parameter can be received when establishing an initial carrier with a cell in the wireless network, and the configuration parameter(s) may indicate a period of time to perform a power control procedure during synchronization before transmitting over the carrier. According to aspects described herein, the period of time to perform a power control procedure during synchronization can be shortened for another carrier activated in the same cell or otherwise with the network entity providing the cell. For example, the cell (or network entity) can signal different values for the configuration parameter(s) relating to establishing subsequent carriers (e.g., secondary carriers) versus an initial carrier (e.g., a primary carrier). In another example, a reduction of the configuration parameter(s) received for establishing a carrier (e.g., the initial carrier) may be determined and used when activating the subsequent carrier. In yet another example, a plurality of transmit power control commands (TPC) utilized in performing power control for the subsequent carrier can be evaluated to determine whether a level of transmit power balance is achieved over the subsequent carrier before the period of time indicated by the configuration parameters has expired.

Figure 1:
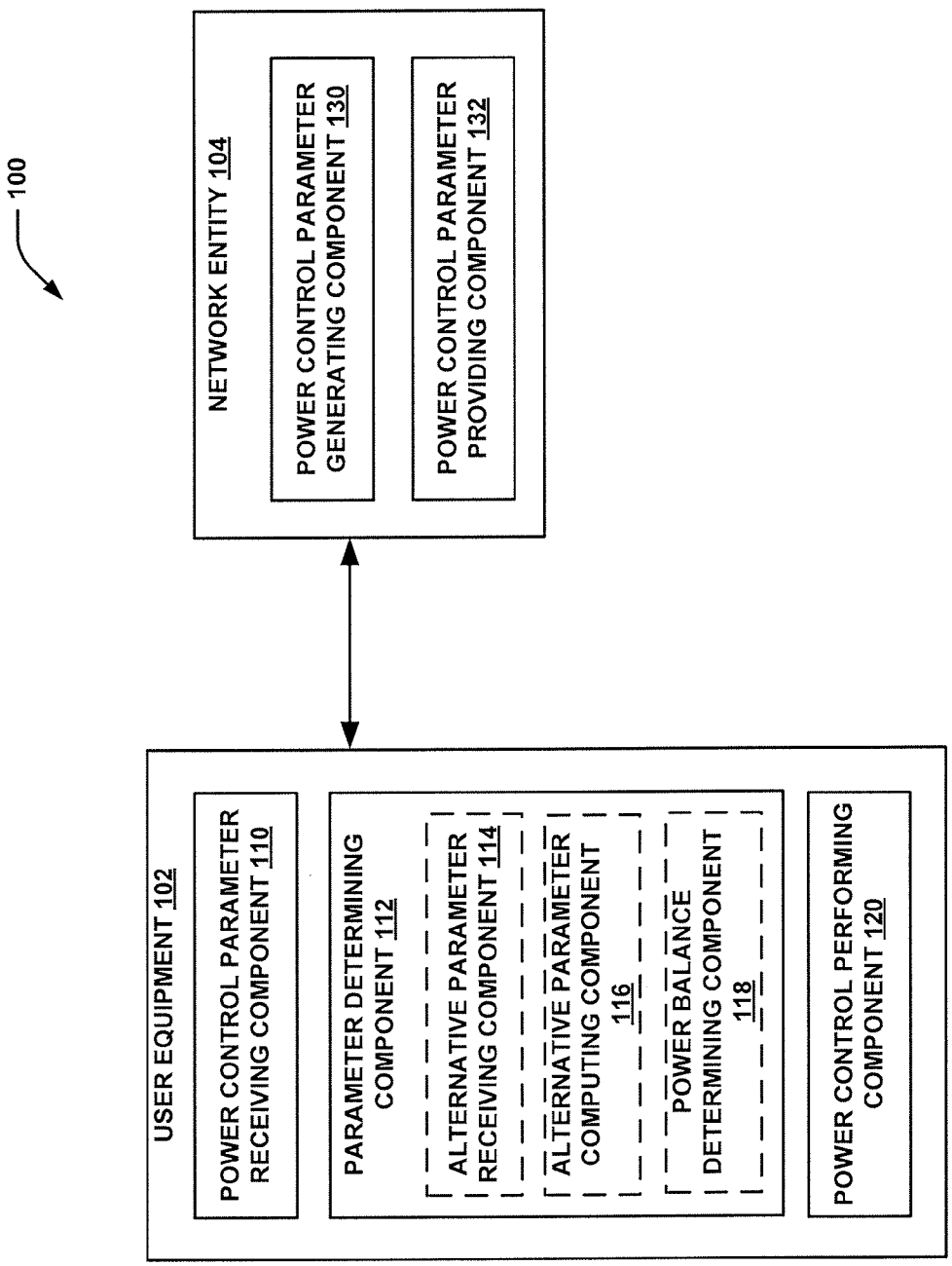
FIG. 1 is a block diagram illustrating an example wireless communications system according to aspects described herein.
Figure 2:
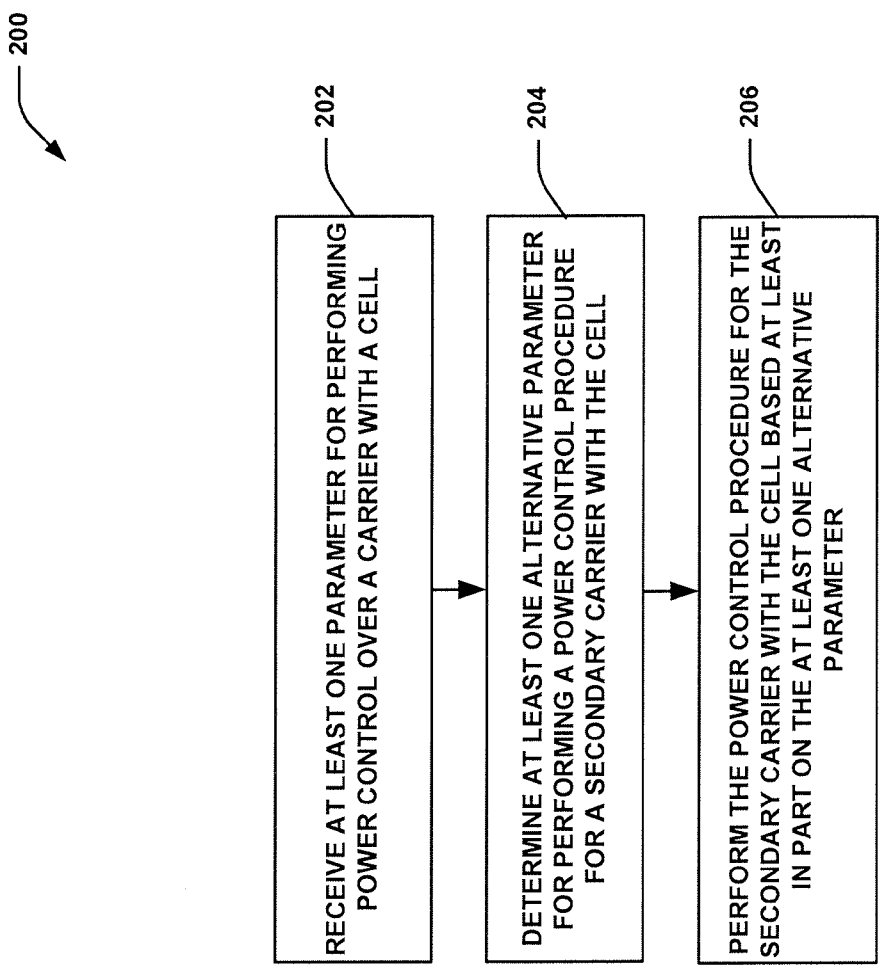
FIG. 2 is a flow diagram comprising a plurality of functional blocks representing an example methodology for performing power control over one or more carriers.
Figure 3:
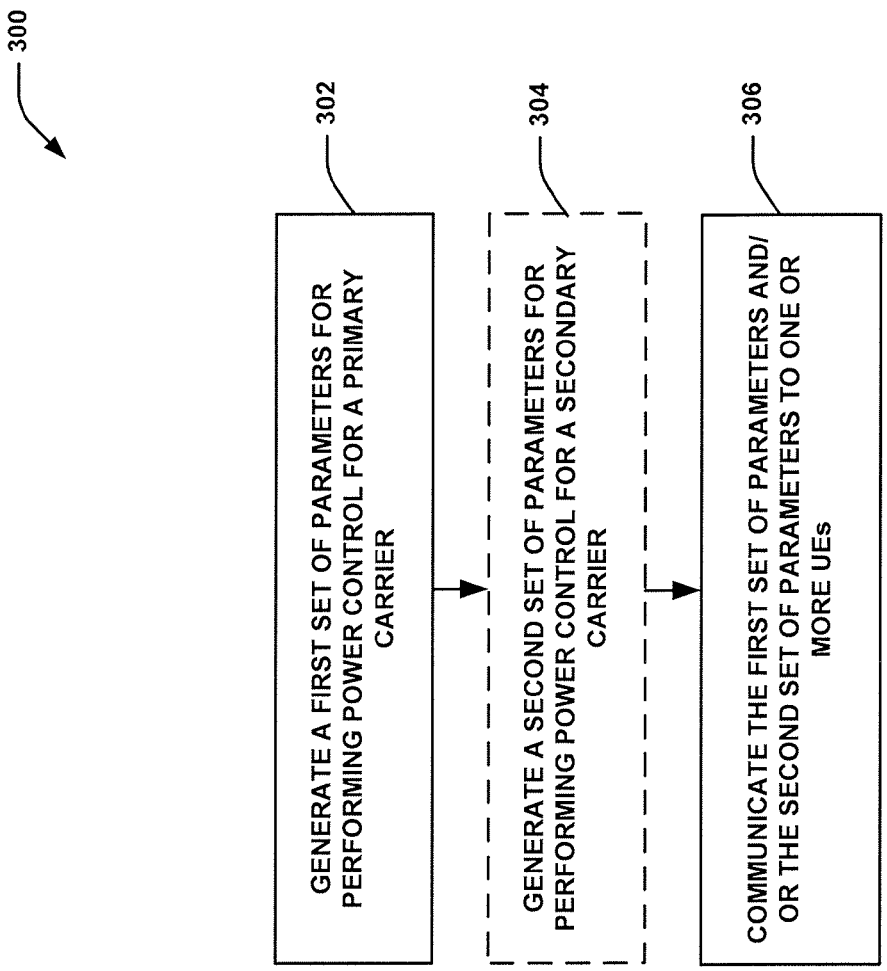
FIG. 3 is a flow diagram comprising a plurality of functional blocks representing an example methodology for communicating parameters related to power control.

Referring to FIGS. 1-3, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 2 and 3 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 1 is a schematic diagram illustrating a system 100 for wireless communication, according to an example configuration. System 100 includes a user equipment (UE) 102 that communicates with a network entity 104 in one or more wireless networks. It is to be appreciated that multiple UEs 102 can communicate with a network entity 104 and/or UE 102 can communicate with multiple network entities 104 in some network configurations. Moreover, UE 102 and network entity 104 can communicate over multiple carriers, as described further herein, to facilitate improved throughput, functionality, reliability, etc.

According to an example, UE 102 is operable to modify power control operations when activating a secondary carrier in a multi-carrier configuration. For example, in an aspect, UE 102 may include a power control parameter receiving component 110 operable to receive parameters, such as a power control preamble value and/or a signaling radio bearer (SRB) delay, for performing power control over a carrier with a cell, which may be generated by network entity 104. Further, UE 102 may include a parameter determining component 112 operable to determine alternative parameters for performing power control for a secondary carrier with the cell. For example, in an aspect, parameter determining component 112 may determine that the alternative parameters have been provided by network entity 104 or may be a function or part of parameters already received, or that the alternative parameters may be based on a power balance condition between UE 102 and network entity 104. Additionally, UE 102 may further include a power control performing component 120, which is operable to use the alternative parameters for performing power control for the secondary carrier with the cell. As such, in an aspect, UE 102 may transmit on the secondary carrier at an earlier time, relative to conventional techniques based on parameters received from the network entity 104, which can enable a more efficient dynamic activation of the secondary carrier.

Network entity 104 can include a power control parameter generating component 130 for generating one or more power control parameters for a primary and/or secondary carrier for providing to one or more UEs, and a power control parameter providing component 132 for providing the one or more power control parameters to one or more UEs (e.g., in broadcast signaling, dedicated signaling, etc.). The one or more power control parameters can correspond to a power control preamble value, SRB delay, etc. for a given carrier, for a primary carrier, and/or for additional carriers, a fraction of the power control preamble value, SRB delay, etc. for additional carriers, a power balance determination metric to utilize in determining whether power balance is achieved before utilizing an additional carrier, and/or the like, as described further herein.

UE 102 may comprise any type of mobile device, such as, but not limited to, a smartphone, cellular telephone, mobile phone, laptop computer, tablet computer, or other portable networked device that can be a standalone device, tethered to another device (e.g., a modem connected to a computer), a watch, a personal digital assistant, a personal monitoring device, a machine monitoring device, a machine to machine communication device, and/or the like. In addition, UE 102 may also be referred to by those skilled in the art as a mobile station, a subscriber station, a mobile unit, a subscriber unit, a wireless unit, a remote unit, a mobile device, a mobile communications device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In general, UE 102 may be small and light enough to be considered portable and may be configured to communicate wirelessly via an over-the-air (OTA) communication link using one or more OTA communication protocols described herein. Additionally, in some examples, UE 102 may be configured to facilitate communication on multiple separate networks via multiple separate subscriptions, multiple radio links, and/or the like.

Furthermore, network entity 104 may comprise one or more of any type of network module, such as an access point, a macro cell, including a base station (BS), node B, eNodeB (eNB), a relay, a peer-to-peer device, an authentication, authorization and accounting (AAA) server, a mobile switching center (MSC), a mobility management entity (MME), a radio network controller (RNC), a small cell, etc. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a BS, an access point, a femto node, a femtocell, a pico node, a micro node, a Node B, eNB, home Node B (HNB) or home evolved Node B (HeNB). Therefore, the term "small cell," as used herein, refers to a relatively low transmit power and/or a relatively small coverage area cell as compared to a macro cell. Additionally, network entity 104 may communicate with one another and/or with one or more other network entities of wireless and/or core networks.

Additionally, system 100 may include any network type, such as, but not limited to, wide-area networks (WAN), wireless networks (e.g. 802.11 or cellular network, such as Global System for Mobile Communications (GSM) or its derivatives, etc.), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet. Such networks may comprise a Wideband Code Division Multiple Access (W-CDMA) system, and may communicate with one or more UEs 102 according to this standard. As those skilled in the art will readily appreciate, various aspects described herein may be extended to other telecommunication systems, network architectures and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The various devices coupled to the network(s) (e.g., UEs 102, network entity 104, etc.) may be coupled to a core network via one or more wired or wireless connections.

FIG. 2 illustrates an example method 200 for performing power control during synchronization of a carrier in a wireless network. Method 200 includes, at Block 202, receiving at least one parameter for performing power synchronization over a carrier with a cell. In an aspect, for instance, UE 102 includes a power control parameter receiving component 110 for receiving the at least one parameter for performing power control over the carrier with the cell. As described further herein, power control parameter providing component 132 can transmit the power control parameters to the UE 102 in a broadcast signal (e.g., master information block (MIB), system information block (SIB), etc.), dedicated signal (e.g., control information in a control signal, such as in a dedicated physical channel (DPCH), enhanced DPCH (E-DPCH), etc.), and/or the like. For example, as described further herein, performing power control over the carrier can include performing the power control during synchronization of the carrier with the network. The at least one received parameter can correspond to a power control preamble value specifying a number of frames (or other measure of time) over which to apply a power control preamble to transmissions over the carrier, a signaling radio bearer (SRB) delay value specifying a number of frames (or other measure of time) during which to not send any data on certain signaling radio bearers, and/or the like. When taken together, parameters such as the power control preamble value and SRB delay can cause the UE 102 to transmit the power control preamble before transmitting data communications to the network entity 104 for a number of frames (e.g., in some systems this can be 0-7 frames) to allow the network entity 104 to control power of the UE 102 through TPC commands to raise or lower power (e.g., which can be a bit indicator) over time to allow the UE 102 to achieve or nearly achieve a desired or optimal power in communicating with network entity 104.

Accordingly, power control parameter receiving component 110 may receive the at least one parameter transmitted by power control parameter providing component 132 when establishing an initial connection with the network entity 104 (e.g., at a radio resource control (RRC) layer), which can include establishing at least a primary carrier with the network entity 104 or a related cell provided by the network entity 104. In this regard, during a synchronization process for the primary carrier, the power control performing component 120 may perform a power control procedure, which may include power control performing component 120 transmitting the power control preamble for a duration specified in the parameters (e.g., a power control preamble value parameter) and/or refraining from transmitting data over SRBs for a delay duration specified in the parameters (e.g., a SRB delay parameter). A power control procedure can also be generally referred to herein as power control. In this regard, network entity 104 can receive the power control preamble from UE 102 and can transmit TPC commands to the UE 102 to indicate whether the UE 102 should increase or decrease transmit power. Once the duration of the power control preamble value, SRB delay, etc., has expired, and/or when UE 102 obtains a channel grant from the network entity 104, UE 102 can transmit data over the carrier to the network entity 104. As described, when activating a secondary carrier in the same cell and/or with the same network entity in the same or different cell (e.g., with the network entity 104), the power control may not need be performed (or may not need to be performed for the full duration indicated in the power control parameters) since UE 102 is likely in a desirable power balance with network entity 104 or related cell based on the previous power control performed during synchronization of the primary carrier.

Method 200 further includes, at Block 204, determining at least one alternative parameter for performing a power control procedure for a secondary carrier with the cell. In an aspect, for instance, UE 102 includes a parameter determining component 112 for determining the at least one alternative parameter for performing the power control procedure for the secondary carrier. For example, the at least one alternative parameter can relate to performing the power control procedure during synchronization of the secondary carrier with network entity 104 or a related cell, and may result in a shorter power control procedure than that used in establishing the primary carrier with network entity 104 or a related cell (e.g., the same or different cell than for the secondary carrier). In one example, establishing the secondary carrier with network entity 104 can be performed at layer 1 (L1) (e.g., a physical (PHY) layer). Parameter determining component 112 optionally includes one or more of the following components shown in dotted line: an alternative parameter receiving component 114 for obtaining alternative power control parameters for secondary carriers from the network entity 104; an alternative parameter computing component 116 for determining alternative power control parameters based on the parameters received and used for power control on the primary carrier; or a power balance determining component 118 for determining whether a power balance is achieved over the secondary carrier before the duration specified in the power control parameters.

Method 200 further includes, at Block 206, performing the power control procedure for the secondary carrier with the cell based at least in part on the at least one alternative parameter. Power control performing component 120 can perform the power control procedure for the secondary carrier with the cell (e.g., a cell provided by network entity 104) based at least in part on the at least one alternative parameter. Thus, as described, power control performing component 120 can utilize a power control preamble value, SRB delay, etc. for performing the power control procedure over the secondary carrier, where the power control preamble value, SRB delay, etc. are of lesser value and thus result in a shorter power control procedure than that utilized for establishing the primary carrier with network entity 104. In another example, power control performing component 120 can perform the power control procedure for a period of time until power balance determining component 118 determines that a power balance with the network entity 104 is achieved over the secondary carrier, regardless of power control parameters received from network entity 104.

In one example, power control parameter providing component 132 can specify different power control parameter(s) for the primary and secondary carriers (e.g., for RRC or L1 established carriers). The power control parameter(s) for the secondary carrier can be a fraction of those for the primary carrier, for example, as some level of power balance between the network entity 104 and UE 102 can be presumed based on establishing the primary carrier. In a specific but non-limiting example, power control parameter providing component 132 can specify a power control preamble duration and a SRB delay duration that are less for the secondary carrier than those specified for power control on the primary carrier (e.g., in broadcast and/or dedicated signaling). In these examples, determining the at least one alternative parameter may include alternative parameter receiving component 114 receiving the at least one alternative parameter from network entity 104, as transmitted by power control parameter providing component 132. For example, alternative parameter receiving component 114 may obtain the alternative parameter(s) in the same message from power control parameter providing component 132 in which power control parameter receiving component 110 receives the power control parameters for the primary carrier (e.g. in the same MIB, SIB, DPCH, E-DPCH, etc.). In another example alternative parameter receiving component 114 may receive the alternative parameter(s) in a different message from the network entity 104 (e.g., as part of establishing the secondary carrier or otherwise, such as in a DPCH, E-DPCH, etc. message over the second carrier). Power control performing component 120 can perform the power control procedure for the secondary carrier using the alternative parameters to shorten the power control time in synchronizing the secondary (L1) carrier as compared to synchronizing the primary carrier, and UE 102 can subsequently communicate over the secondary carrier.

In another example, alternative parameter computing component 116 can compute the alternative parameter(s) for the power control procedure on secondary carriers as a fraction of the power control parameter(s) received in signaling from power control parameter providing component 132 by power control parameter receiving component 110. In a specific but non-limiting example, alternative parameter computing component 116 can compute a fraction of the power control preamble duration, SRB delay duration, etc. received from power control parameter providing component 132 for power control of established carriers therewith. The power control preamble duration and SRB delay duration indicate a number of frames (e.g., 0-7), and thus alternative parameter computing component 116 may compute a fraction of the frames for performing the power control procedure (e.g., ½, ¼, etc.), which may be rounded up or down to a next or previous whole frame. The fraction may be configured in the UE 102, received from network entity 104 or another network entity (e.g., when initially provisioning on an associated network), etc. In yet another example, alternative parameter computing component 116 can select a fixed value for the alternative parameter regardless of the parameter(s) received from power control parameter receiving component 110. Similarly, the fixed value may be configured in the UE 102, received from network entity 104 or another network entity (e.g., when initially provisioning on an associated network), etc. Power control performing component 120, in these examples, can perform power control for the secondary carrier using the at least one alternative parameter to shorten the power control time (e.g., to shorten the power control preamble duration, to shorten the SRB delay, and/or the like) in synchronizing the secondary (L1) carrier with network entity 104 or related cell. Thus, UE 102 can communicate with network entity 104 over the secondary carrier after a shorter delay than expected based on the at least one alternative power control parameter.

In yet another example, power balance determining component 118 can determine when a level of power balance has been achieved over the secondary carrier by power control performing component 120, which may occur before expiration of durations specified in the power control parameters received by power control parameter receiving component 110. In this example, power balance determining component 118 can determine the one or more alternative parameters as parameters for detecting the power balance, as described further herein. Once power balance determining component 118 determines the power is balanced over the secondary carrier based on the one or more alternative parameters, power control performing component 120 can terminate the power control procedure for the secondary carrier in one or more subsequent frames from the frame when the power balancing begins. UE 102 may then begin communicating over the secondary carrier.

In an example, power balance determining component 118 can determine the level of power balance over the secondary carrier with network entity 104 based on observing TPC commands received from the network entity 104 when performing power control for the secondary carrier. In this regard, for example, power control performing component 120 can initiate a power control procedure over the secondary carrier using at least the power control preamble duration received by power control parameter receiving component 110, but may terminate the power, as described, when power control performing component 120 determines a power balance is achieved.

For example, where the TPC commands received from network entity 104 during the power control procedure are bit indicators of whether to increase the power ("1") or decrease the power ("0"), the alternative parameters can correspond to a threshold number of 0's (Y) and a threshold number of 1's (Z) received in the last X TPC slots (e.g., each frame can include 15 TPC slots) to indicate that a power balance is achieved. For example, an ideal power balance can be indicated by receiving alternating 1's and 0's. In one specific but non-limiting example, power balance determining component 118 can determine that a sufficiently desirable power balance is achieved during the power control procedure as for X=15, Y=5 and Z=5 (thus out of the 15 TPC commands, at least 5 increase commands were received and at least 5 decrease commands were received). In this example, if power balance determining component 118 detects these alternative parameters are satisfied, power control performing component 120 can cease the power control procedure for the secondary carrier (e.g., regardless of the power control parameters received from power control parameter receiving component 110), and UE 102 can begin transmitting over the secondary carrier. This may occur as soon as the first 15 slots, in this example, which is less than 2 frames in LTE. In this specific example, the UE 102 can begin transmitting over the secondary carrier in the third frame. In an example, the threshold parameters (e.g., Y, Z) and/or the number of TPC slots (e.g., X) can be communicated to UE 102 by power control parameter providing component 132 can be stored in a configuration at UE 102, etc.

It is to be appreciated that in addition to improving performance of the UE 102 in activating secondary carriers, the above described concepts can also improve network resource management since the UEs that are in good power conditions with respect to the network can release resources sooner, which can then be used for other UEs.

FIG. 3 illustrates an example method 300 for communicating power control parameters to one or more UEs. Method 300 includes, at Block 302, generating a first set of parameters for performing power control for a primary carrier. Power control parameter generating component 130 (FIG. 1) can generate the first set of parameters for performing power control for the primary carrier. As described, network entity 104 can establish a primary carrier for UE 102, and can generate power control parameters for the UE to perform power control over the carrier, such as a power control preamble duration, SRB delay, etc. In an example, network entity 104 can set the parameters based on a configuration, based on one or more performance metrics (e.g., backhaul capacity, radio frequency load, etc.). It is to be appreciated that the first set of parameters can include one or more parameters.

Method 300 also includes, at Block 304, generating a second set of parameters for performing power control for a secondary carrier. Power control parameter generating component 130 can also generate the second set of parameters for performing power control for the secondary carrier. As described, Block 304 may be optional as the UE, in some examples, can determine the second set of parameters (e.g., alternative parameters) based on the received first set of parameters relating to the primary carrier and/or based on a configuration. In an example, power control parameter generating component 130 may generate the second set of parameters to include explicit parameters for the secondary carrier, such as a power control preamble duration, SRB delay, etc. specific for the secondary carrier. In another example, power control parameter generating component 130 may generate the second set of parameters to include a fraction or other parameter which the UE 102 can apply to the first set of parameters to determine alternative parameters for power control over the secondary carrier. In yet another example, power control parameter generating component 130 can generate the second set of parameters to include parameters that allow UE 102 to determine when a power balance is achieved over the secondary carrier, such as a number of 0's (Y), and/or a number of 1's (Z) that are to be received by the UE 102 over a number of TPC slots (X) to determine power balance is achieved and terminate a power control procedure. It is to be appreciated that the second set of parameters can include one or more parameters.

Method 300 also includes, at Block 306, communicating the first set of parameters and/or the second set of parameters to one or more UEs. Power control parameter providing component 132 can communicate the first set of parameters and/or the second set of parameters to the one or more UEs (e.g., UE 102). As described above, UE 102 can utilize the first set of parameters to perform power control over a primary carrier with network entity 104, and/or can utilize the second set of parameters to perform power control over a secondary carrier with the network entity 104, such that the performing power control over the secondary carrier may take less time than performing power control over the primary carrier. As described, for example, power control parameter providing component 132 can communicate the first set of parameters and/or the second set of parameters over a PDCH, E-PDCH, etc. over the primary and/or secondary carrier, in a broadcast message (e.g., MIB, SIB, etc.), and/or the like.

Figure 4:
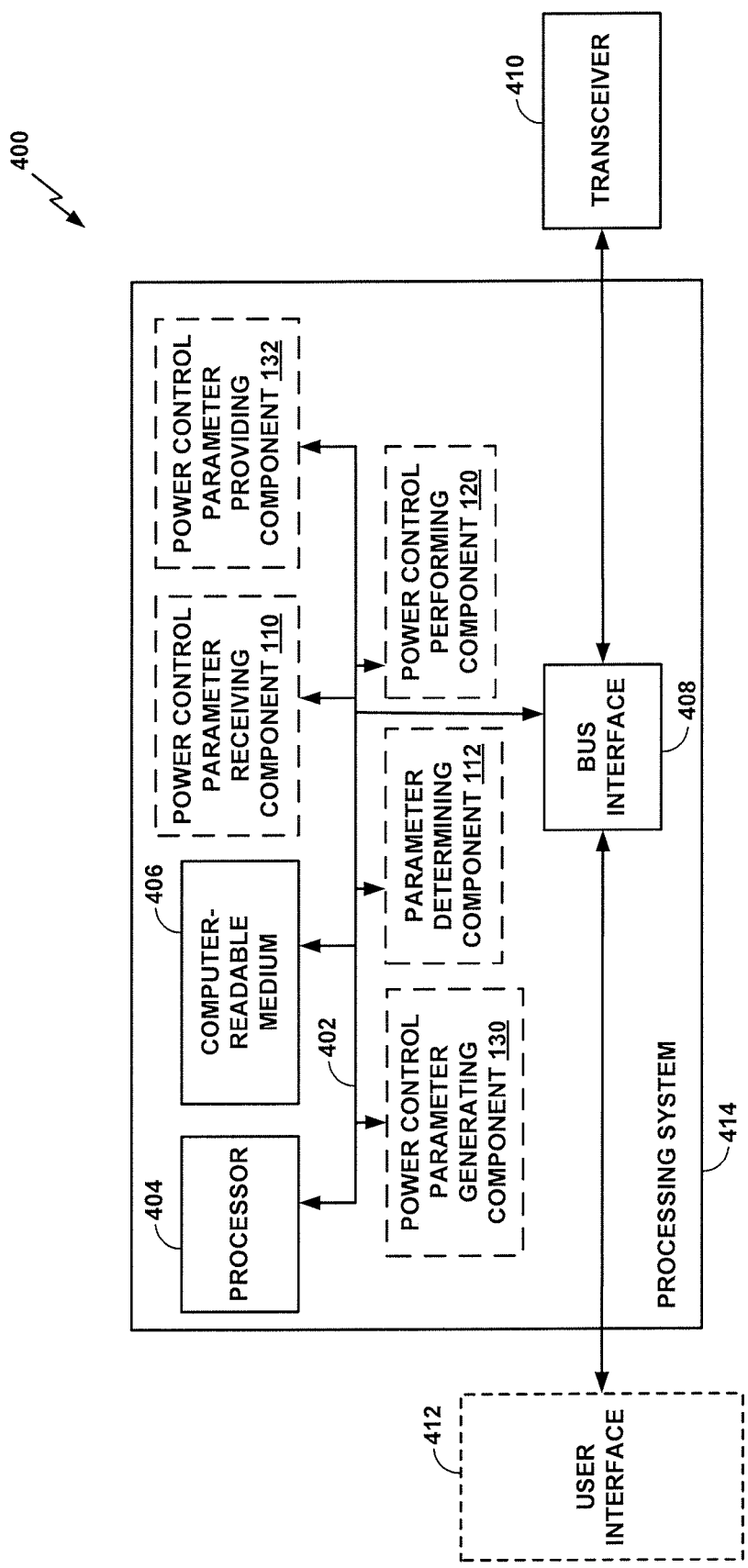
FIG. 4 is a diagram illustrating an example of a hardware implementation for an apparatus employing a processing system.

FIG. 4 is a conceptual diagram illustrating an example of a hardware implementation for an apparatus 400 employing a processing system 414 for performing power control over a secondary carrier, as described herein. In some examples, the processing system 414 may comprise a UE or one or more components of a UE (e.g., UE 102 of FIG. 1, and/or related components, etc.), a network entity or one or more components of a network entity (e.g., network entity 104 of FIG. 1, and/or related components, etc.). In this example, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits including one or more processors, represented generally by the processor 404, computer-readable media, represented generally by the computer-readable medium 406, power control parameter receiving component 110, parameter determining component 112, power control performing component 120, power control parameter generating component 130, power control parameter providing component 132, components thereof, etc. (see FIG. 1), which may be configured to carry out one or more methods or procedures described herein, such as performing power control, communicating parameters relating to performing power control, etc., as described in method 200 (FIG. 2), method 300 (FIG. 3), etc.

The bus 402 may also link various other circuits such as timing sources, peripherals, voltage regulators, and power management circuits, which are well known in the art. A bus interface 408 provides an interface between the bus 402 and a transceiver 410. The transceiver 410 provides a means for communicating with various other apparatus over a transmission medium. Depending upon the nature of the apparatus, a user interface 412 (e.g., keypad, display, speaker, microphone, joystick) may also be provided.

The processor 404 is responsible for managing the bus 402 and general processing, including the execution of software stored on the computer-readable medium 406. The software, when executed by the processor 404, causes the processing system 414 to perform the various functions described infra for any particular apparatus. The computer-readable medium 406 may also be used for storing data that is manipulated by the processor 404 when executing software.

In an aspect, processor 404, computer-readable medium 406, or a combination of both may be configured or otherwise specially programmed to perform the functionality of the power control parameter receiving component 110, parameter determining component 112, power control performing component 120, power control parameter generating component 130, power control parameter providing component 132, components thereof, etc. (see FIG. 1), or various other components described herein. For example, processor 404, computer-readable medium 406, or a combination of both may be configured or otherwise specially programmed to perform the functionality of the power control parameter receiving component 110, parameter determining component 112, power control performing component 120, power control parameter generating component 130, power control parameter providing component 132, components thereof, etc. described herein (e.g., the method 200 in FIG. 2, method 300 in FIG. 3, etc.), and/or the like.

Figure 5:
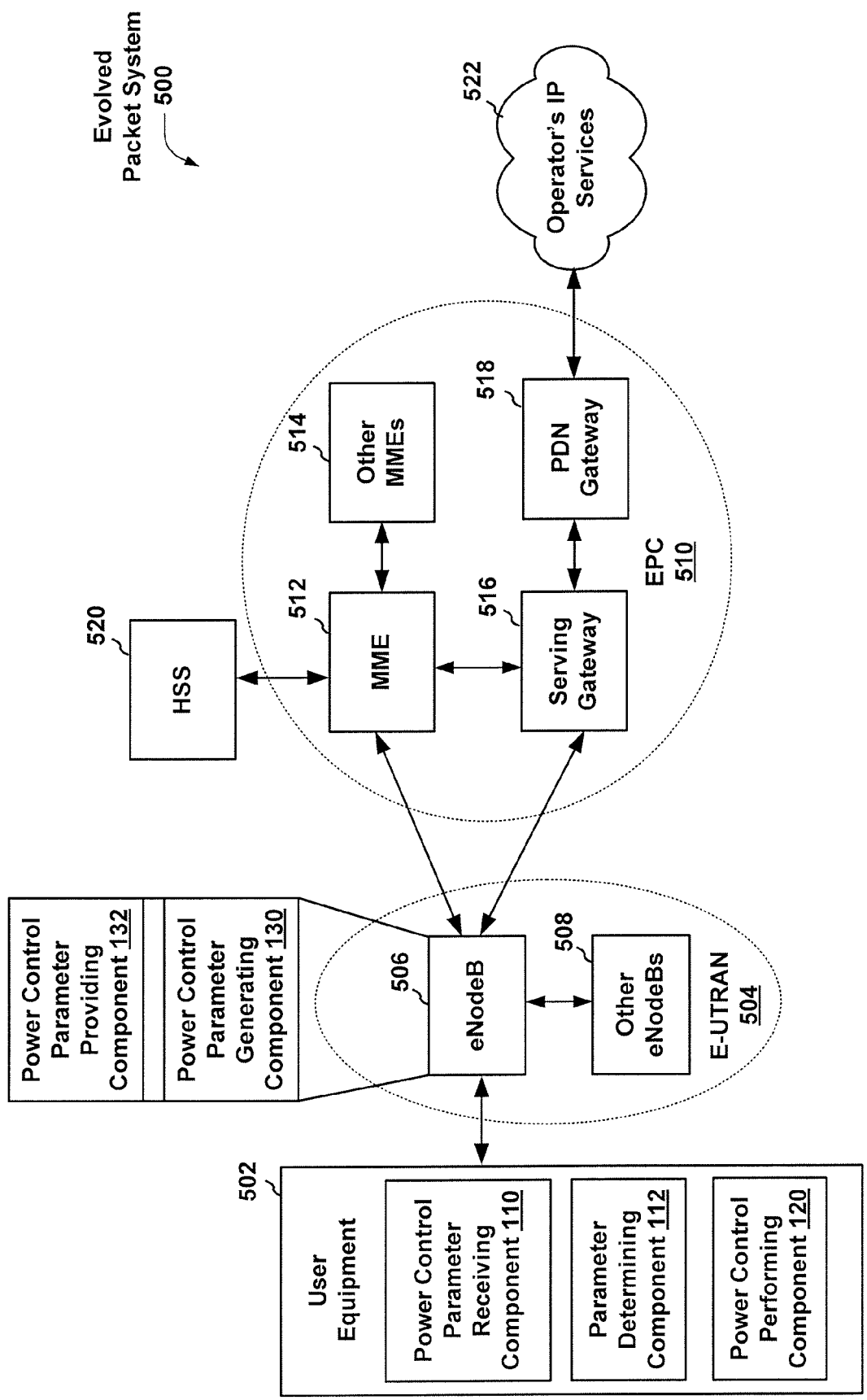
FIG. 5 is a block diagram conceptually illustrating an example of an LTE telecommunications system.

FIG. 5 is a diagram illustrating an LTE network architecture 500 employing various apparatuses (e.g., UE 102 and network entity 104 of FIG. 1), including one or more UEs operable to perform power control over a secondary carrier, as described herein. The LTE network architecture 500 may be referred to as an Evolved Packet System (EPS) 500. The EPS 500 may include one or more user equipment (UE) 502 (which may represent an example of UE 102 and may include one or more of its various components described in FIG. 1). Accordingly, UE 502 may also include a power control parameter receiving component 110, parameter determining component 112, power control performing component 120, components thereof, etc. (see FIG. 1), which may be configured to carry out one or more methods or procedures described herein, such as performing power control, as described in method 200 (FIG. 2). EPS 500 can further include an Evolved UMTS Terrestrial Radio Access Network (E-UTRAN) 504, an Evolved Packet Core (EPC) 510, a Home Subscriber Server (HSS) 520, and an Operator's IP Services 522. The EPS can interconnect with other access networks, but for simplicity those entities/interfaces are not shown. As shown, the EPS provides packet-switched services, however, as those skilled in the art will readily appreciate, the various concepts presented herein may be extended to networks providing circuit-switched services.

The E-UTRAN includes the evolved Node B (eNB) 506 and other eNBs 508, one or more of which may represent an example of network entity 104 of FIG. 1 (and/or one or more related components). Thus, for example, eNB 506 and/or other eNBs 508 can include a power control parameter generating component 130, power control parameter providing component 132, components thereof, etc. (see FIG. 1), which may be configured to carry out one or more methods or procedures described herein, such as communicating parameters relating to performing power control, etc., as described in method 300 (FIG. 3). Additionally, the eNB 506 provides user and control plane protocol terminations toward the UE 502. The eNB 506 may be connected to the other eNBs 508 via an X2 interface (i.e., backhaul). The eNB 506 may also be referred to by those skilled in the art as a base station, a base transceiver station, a radio base station, a radio transceiver, a transceiver function, a basic service set (BSS), an extended service set (ESS), or some other suitable terminology. The eNB 506 provides an access point to the EPC 510 for a UE 502. Examples of UEs 502 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 502 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 506 is connected by an S1 interface to the EPC 510. The EPC 510 includes a Mobility Management Entity (MME) 512, other MMEs 514, a Serving Gateway 516, and a Packet Data Network (PDN) Gateway 518. The MME 512 is the control node that processes the signaling between the UE 502 and the EPC 510. Generally, the MME 512 provides bearer and connection management. All user IP packets are transferred through the Serving Gateway 516, which itself is connected to the PDN Gateway 518. The PDN Gateway 518 provides UE IP address allocation as well as other functions. The PDN Gateway 518 is connected to the Operator's IP Services 522. The Operator's IP Services 522 include the Internet, the Intranet, an IP Multimedia Subsystem (IMS), and a PS Streaming Service (PSS).

Figure 6:
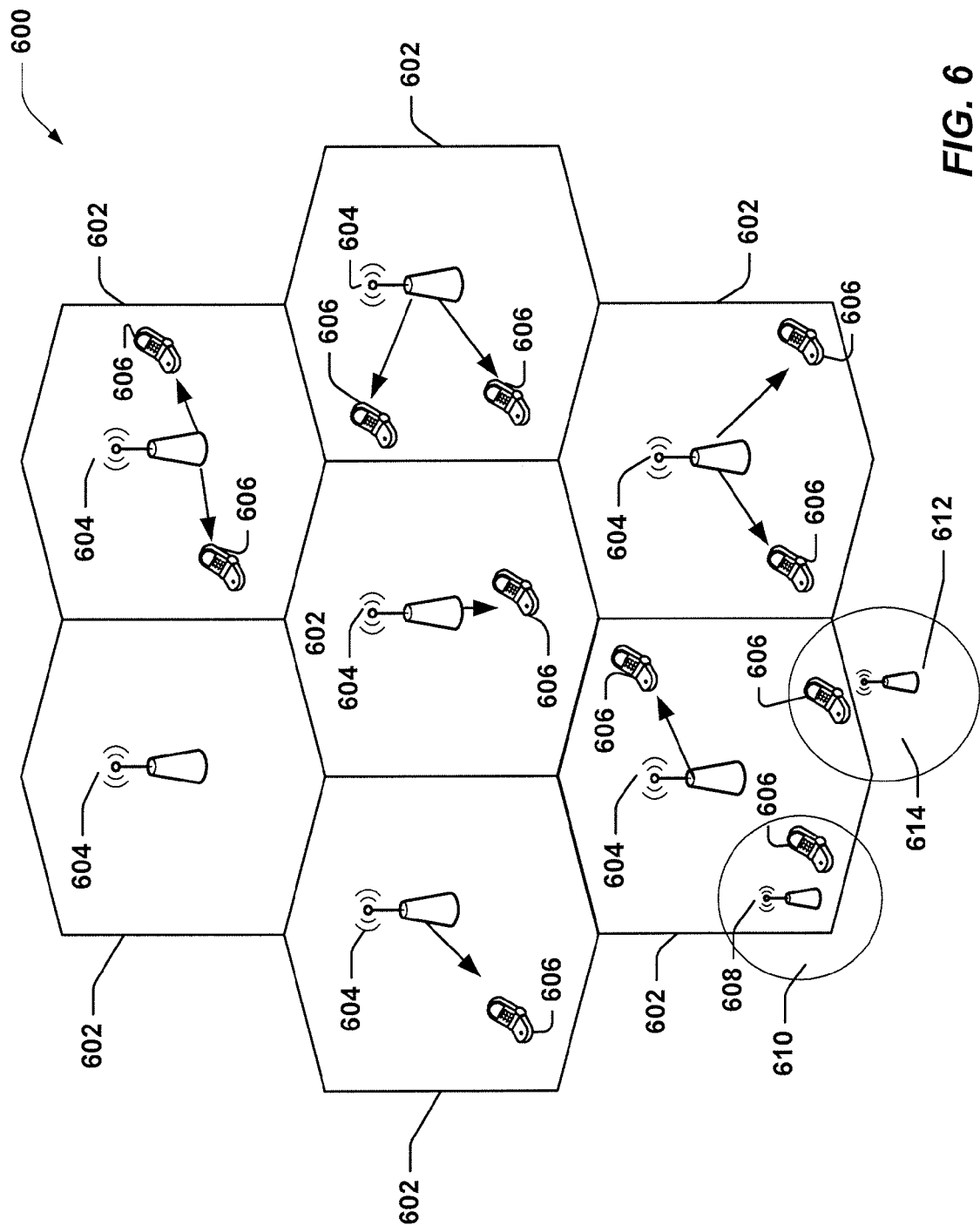
FIG. 6 is a diagram illustrating an example of an access network in an LTE network architecture.

FIG. 6 is a diagram illustrating an example of an access network in an LTE network architecture, including one or more UEs operable to perform power control over a secondary carrier, as described herein. In this example, the access network 600 is divided into a number of cellular regions (cells) 602. One or more lower power class eNBs 608, 612 may have cellular regions 610, 614, respectively, that overlap with one or more of the cells 602. The lower power class eNBs 608, 612 may be small cells (e.g., home eNBs (HeNBs)). A higher power class or macro eNB 604 is assigned to a cell 602 and is configured to provide an access point to the EPC 510 for all the UEs 606 in the cell 602. There is no centralized controller in this example of an access network 600, but a centralized controller may be used in alternative configurations. The eNB 604 is responsible for all radio related functions including radio bearer control, admission control, mobility control, scheduling, security, and connectivity to the serving gateway 516. In an aspect, one or more of the eNBs 604, 608, 612 may represent an example of network entity 104 of FIG. 1, and/or may include one or more related components for performing functions described herein. For example eNBs 604, 608, 612 may include a power control parameter generating component 130, power control parameter providing component 132, components thereof, etc. (see FIG. 1), which may be configured to carry out one or more methods or procedures for communicating parameters relating to performing power control, as described in method 300 (FIG. 3).

The modulation and multiple access scheme employed by the access network 600 may vary depending on the particular telecommunications standard being deployed. In LTE applications, orthogonal frequency-division multiplexing (OFDM) is used on the downlink (DL) and single-carrier frequency division multiple access (SC-FDMA) is used on the uplink (UL) to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 604 may have multiple antennas supporting multiple-input, multiple output (MIMO) technology. The use of MIMO technology enables the eNB 604 to exploit the spatial domain to support spatial multiplexing, beamforming, and transmit diversity.

Spatial multiplexing may be used to transmit different streams of data simultaneously on the same frequency. The data steams may be transmitted to a single UE 606 to increase the data rate or to multiple UEs 606 to increase the overall system capacity. This is achieved by spatially precoding each data stream and then transmitting each spatially precoded stream through a different transmit antenna on the downlink. The spatially precoded data streams arrive at the UE(s) 606 with different spatial signatures, which enables each of the UE(s) 606 to recover the one or more data streams destined for that UE 606. On the uplink, each UE 606 transmits a spatially precoded data stream, which enables the eNB 604 to identify the source of each spatially precoded data stream. In an aspect, UE 606 may represent an example of UE 102, and may include one or more of its various components for performing functions described herein (e.g., in FIG. 1). Thus, for example, UE 606 may include a power control parameter receiving component 110, parameter determining component 112, power control performing component 120, components thereof, etc. (see FIG. 1), which may be configured to carry out one or more methods or procedures for performing power control, as described in method 200 (FIG. 2).

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 7:
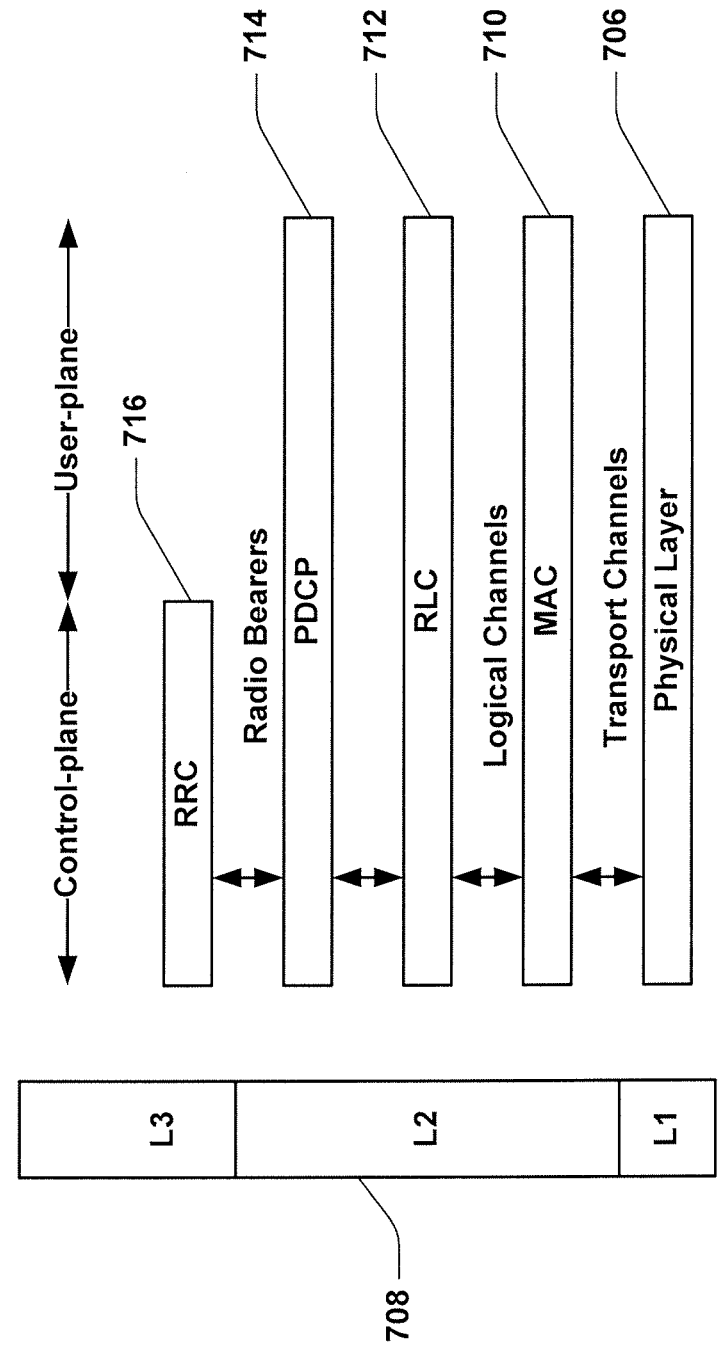
FIG. 7 is a diagram illustrating an example of a radio protocol architecture for the user and control plane.

Turning to FIG. 7, the radio protocol architecture for a UE (e.g., UE 102 with one or more of its various components as described in FIG. 1) and an eNB (e.g., network entity 104 with one or more of its various components as described in FIG. 1) is shown with three layers: Layer 1, Layer 2, and Layer 3. Layer 1 is the lowest layer and implements various physical layer signal processing functions. Layer 1 will be referred to herein as the physical layer 706. For example, a UE can include a power control performing component 120 may perform power control at the physical layer 706, and/or a power control parameter receiving component 110 for receiving power control parameters (e.g., from an eNB) at a higher layer. Layer 2 (L2 layer) 708 is above the physical layer 706 and is responsible for the link between the UE and eNB over the physical layer 706.

In the user plane, the L2 layer 708 includes a media access control (MAC) sublayer 710, a radio link control (RLC) sublayer 712, and a packet data convergence protocol (PDCP) 714 sublayer, which are terminated at the eNB on the network side. Although not shown, the UE may have several upper layers above the L2 layer 708 including a network layer (e.g., IP layer) that is terminated at the PDN gateway 518 (see FIG. 5) on the network side, and an application layer that is terminated at the other end of the connection (e.g., far end UE, server, etc.).

The PDCP sublayer 714 provides multiplexing between different radio bearers and logical channels. The PDCP sublayer 714 also provides header compression for upper layer data packets to reduce radio transmission overhead, security by ciphering the data packets, and handover support for UEs between eNBs. The RLC sublayer 712 provides segmentation and reassembly of upper layer data packets, retransmission of lost data packets, and reordering of data packets to compensate for out-of-order reception due to hybrid automatic repeat request (HARQ). The MAC sublayer 710 provides multiplexing between logical and transport channels. The MAC sublayer 710 is also responsible for allocating the various radio resources (e.g., resource blocks) in one cell among the UEs. The MAC sublayer 710 is also responsible for HARQ operations.

In the control plane, the radio protocol architecture for the UE and eNB is substantially the same for the physical layer 706 and the L2 layer 708 with the exception that there is no header compression function for the control plane. The control plane also includes a radio resource control (RRC) sublayer 716 in Layer 3. The RRC sublayer 716 is responsible for obtaining radio resources (i.e., radio bearers) and for configuring the lower layers using RRC signaling between the eNB and the UE.

Figure 8:
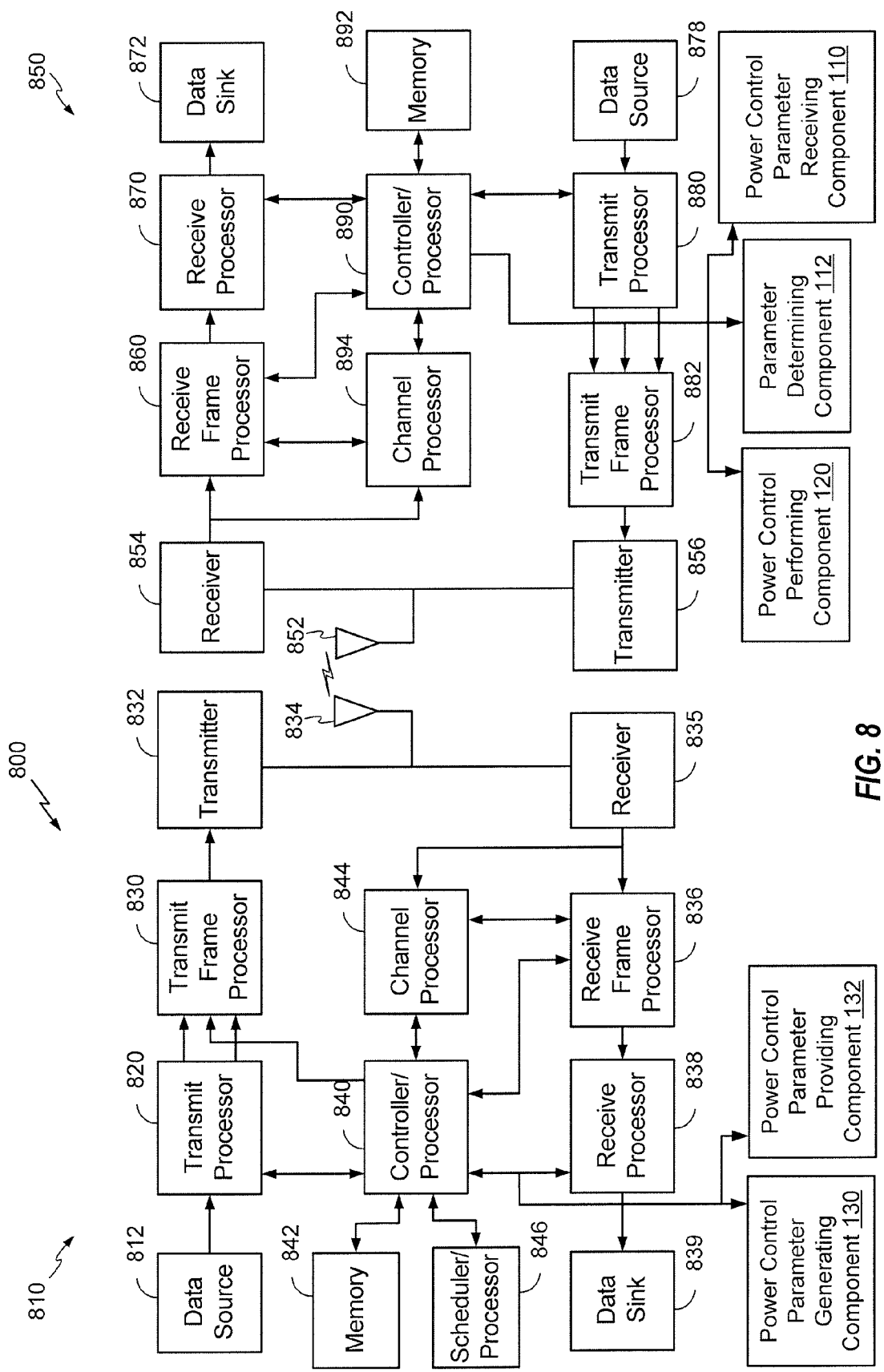
FIG. 8 is a diagram illustrating an example of an evolved Node B and user equipment in an access network.

Referring to FIG. 8, an aspect of a Node B 810 in communication with a UE 850, where the Node B 810 may include network entity 104 in FIG. 1 and/or components thereof (e.g., power control parameter generating component 130, power control parameter providing component 132, etc.) for performing one or more functions described herein, such as communicating parameters relating to performing power control, as described in method 300 (FIG. 3). In an example, controller/processor 840, transmit processor 820, etc. may implement the components and/or related functions. Similarly, UE 850 may include UE 102 in FIG. 1 and/or components thereof (e.g., power control parameter receiving component 110, parameter determining component 112, power control performing component 120, etc.) for performing power control, as described in method 200 (FIG. 2). In an example, controller/processor 890, receive processor 870, transmit processor 880, etc. may implement the components and/or related functions.

In the downlink communication, a transmit processor 820 may receive data from a data source 812 and control signals from a controller/processor 840. The transmit processor 820 provides various signal processing functions for the data and control signals, as well as reference signals (e.g., pilot signals). For example, the transmit processor 820 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 844 may be used by a controller/processor 840 to determine the coding, modulation, spreading, and/or scrambling schemes for the transmit processor 820. These channel estimates may be derived from a reference signal transmitted by the UE 850 or from feedback from the UE 850. The symbols generated by the transmit processor 820 are provided to a transmit frame processor 830 to create a frame structure. The transmit frame processor 830 creates this frame structure by multiplexing the symbols with information from the controller/processor 840, resulting in a series of frames. The frames are then provided to a transmitter 832, which provides various signal conditioning functions including amplifying, filtering, and modulating the frames onto a carrier for downlink transmission over the wireless medium through antenna 834. The antenna 834 may include one or more antennas, for example, including beam steering bidirectional adaptive antenna arrays or other similar beam technologies.

At the UE 850, a receiver 854 receives the downlink transmission through an antenna 852 and processes the transmission to recover the information modulated onto the carrier. The information recovered by the receiver 854 is provided to a receive frame processor 860, which parses each frame, and provides information from the frames to a channel processor 894 and the data, control, and reference signals to a receive processor 870. The receive processor 870 then performs the inverse of the processing performed by the transmit processor 820 in the Node B 810. More specifically, the receive processor 870 descrambles and despreads the symbols, and then determines the most likely signal constellation points transmitted by the Node B 810 based on the modulation scheme. These soft decisions may be based on channel estimates computed by the channel processor 894. The soft decisions are then decoded and deinterleaved to recover the data, control, and reference signals. The CRC codes are then checked to determine whether the frames were successfully decoded. The data carried by the successfully decoded frames will then be provided to a data sink 872, which represents applications running in the UE 850 and/or various user interfaces (e.g., display). Control signals carried by successfully decoded frames will be provided to a controller/processor 890. When frames are unsuccessfully decoded by the receive processor 870, the controller/processor 890 may also use an acknowledgement (ACK) and/or negative acknowledgement (NACK) protocol to support retransmission requests for those frames.

In the uplink, data from a data source 878 and control signals from the controller/processor 890 are provided to a transmit processor 880. The data source 878 may represent applications running in the UE 850 and various user interfaces (e.g., keyboard). Similar to the functionality described in connection with the downlink transmission by the Node B 810, the transmit processor 880 provides various signal processing functions including CRC codes, coding and interleaving to facilitate FEC, mapping to signal constellations, spreading with OVSFs, and scrambling to produce a series of symbols. Channel estimates, derived by the channel processor 894 from a reference signal transmitted by the Node B 810 or from feedback contained in the midamble transmitted by the Node B 810, may be used to select the appropriate coding, modulation, spreading, and/or scrambling schemes. The symbols produced by the transmit processor 880 will be provided to a transmit frame processor 882 to create a frame structure. The transmit frame processor 882 creates this frame structure by multiplexing the symbols with information from the controller/processor 890, resulting in a series of frames. The frames are then provided to a transmitter 856, which provides various signal conditioning functions including amplification, filtering, and modulating the frames onto a carrier for uplink transmission over the wireless medium through the antenna 852.

The uplink transmission is processed at the Node B 810 in a manner similar to that described in connection with the receiver function at the UE 850. A receiver 835 receives the uplink transmission through the antenna 834 and processes the transmission to recover the information modulated onto the carrier. The information recovered by the receiver 835 is provided to a receive frame processor 836, which parses each frame, and provides information from the frames to the channel processor 844 and the data, control, and reference signals to a receive processor 838. The receive processor 838 performs the inverse of the processing performed by the transmit processor 880 in the UE 850. The data and control signals carried by the successfully decoded frames may then be provided to a data sink 839 and the controller/processor, respectively. If some of the frames were unsuccessfully decoded by the receive processor, the controller/processor 840 may also use an acknowledgement (ACK) and/or negative acknowledgement (NACK) protocol to support retransmission requests for those frames.

The controller/processors 840 and 890 may be used to direct the operation at the Node B 810 and the UE 850, respectively. For example, the controller/processors 840 and 890 may provide various functions including timing, peripheral interfaces, voltage regulation, power management, and other control functions. In addition, for example, controller/processors 840 may include one or more components described of the UE 102 and/or network entity 104 in FIG. 1 and/or can perform the related functions thereof, as described herein. The computer readable media of memories 842 and 892 may store data and software for the Node B 810 and the UE 850, respectively (e.g. to perform the functions described herein with respect to UE 102, network entity 104, and/or their related components). A scheduler/processor 846 at the Node B 810 may be used to allocate resources to the UEs and schedule downlink and/or uplink transmissions for the UEs.

In accordance with various aspects described herein, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented herein depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods or methodologies described herein may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: at least one a; at least one b; at least one c; at least one a and at least one b; at least one a and at least one c; at least one b and at least one c; and at least one a, at least one b and at least one c. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such is explicitly recited in the claims. No claim element is to be construed under the provisions of 35 U.S.C. §112(f) unless the element is expressly recited using the phrase "means for" or, in the case of a method claim, the element is recited using the phrase "step for."

The invention claimed is:

1. A method of performing power control over a secondary carrier, comprising:
   receiving at least one parameter for performing power control over a primary carrier with a cell;
   determining, based on the at least one parameter, at least one alternative parameter for performing a power control procedure for a secondary carrier with the cell; and
   performing the power control procedure for the secondary carrier with the cell based at least in part on the at least one alternative parameter,
   wherein determining the at least one alternative parameter comprises determining one or more parameters related to detecting a power balance in performing the power control procedure for the secondary carrier.

2. The method of claim 1, wherein determining the at least one alternative parameter further comprises receiving the at least one alternative parameter from the cell along with the at least one parameter, wherein the at least one parameter relates to performing the power control procedure over the primary carrier.

3. The method of claim 2, wherein the at least one parameter and the at least one alternative parameter each include a power control preamble duration and a signaling radio bearer delay.

4. The method of claim 1, wherein determining the at least one alternative parameter further comprises computing a fraction of the at least one parameter, wherein the at least one parameter relates to performing the power control procedure over the primary carrier.

5. The method of claim 4, wherein the at least one parameter includes a power control preamble duration and a signaling radio bearer delay.

6. The method of claim 1, wherein the one or more parameters include a threshold number of transmit power control (TPC) bit indicators received in a number of TPC slots that indicate the power balance.

7. The method of claim 1, further comprising terminating the power control procedure for the secondary carrier in one or more subsequent frames based on detecting the power balance.

8. The method of claim 7, wherein performing the power control procedure comprises at least one of transmitting a power control preamble over the secondary carrier for a duration specified in the at least one alternative parameter, or refraining from transmitting data over the secondary carrier for a delay duration specified in the at least one alternative parameter.

9. An apparatus for performing power control over a secondary carrier, comprising:
   a power control parameter receiving component configured to receive at least one parameter for performing power control over a primary carrier with a cell;
   a parameter determining component configured to determine, based on the at least one parameter, at least one alternative parameter for performing a power control procedure for a secondary carrier with the cell; and
   a power control performing component configured to perform the power control procedure for the secondary carrier with the cell based at least in part on the at least one alternative parameter,
   wherein the parameter determining component is configured to determine the at least one alternative parameter at least in part by determining one or more parameters related to detecting a power balance in performing the power control procedure for the secondary carrier.

10. The apparatus of claim 9, wherein the parameter determining component is further configured to determine the at least one alternative parameter based at least in part on receiving the at least one alternative parameter from the cell along with the at least one parameter, wherein the at least one parameter relates to performing the power control procedure over the primary carrier.

11. The apparatus of claim 10, wherein the at least one parameter and the at least one alternative parameter each include a power control preamble duration and a signaling radio bearer delay.

12. The apparatus of claim 9, wherein the parameter determining component is further configured to determine the at least one alternative parameter at least in part by computing a fraction of the at least one parameter, wherein the at least one parameter relates to performing the power control procedure over the primary carrier.

13. The apparatus of claim 12, wherein the at least one parameter includes a power control preamble duration and a signaling radio bearer delay.

14. The apparatus of claim 9, wherein the one or more parameters include a threshold number of transmit power control (TPC) bit indicators received in a number of TPC slots that indicate the power balance.

15. The apparatus of claim 9, wherein the power control performing component is further configured to terminate the power control procedure for the secondary carrier in one or more subsequent frames based on detecting the power balance.

16. The apparatus of claim 15, wherein the power control performing component performs the power control procedure at least in part by transmitting a power control preamble over the secondary carrier for a duration specified in the at least one alternative parameter, or refraining from transmitting data over the secondary carrier for a delay duration specified in the at least one alternative parameter.

17. An apparatus for performing power control over a secondary carrier, comprising:
   means for receiving at least one parameter for performing power control over a primary carrier with a cell;
   means for determining, based on the at least one parameter, at least one alternative parameter for performing a power control procedure for a secondary carrier with the cell; and
   means for performing the power control procedure for the secondary carrier with the cell based at least in part on the at least one alternative parameter,
   wherein the means for determining further determines the at least one alternative parameter at least in part by determining one or more parameters related to detecting a power balance in performing the power control procedure for the secondary carrier.

18. The apparatus of claim 17, wherein the means for determining further determines the at least one alternative parameter based at least in part on receiving the at least one alternative parameter from the cell along with the at least one parameter, wherein the at least one parameter relates to performing the power control procedure over the primary carrier.

19. The apparatus of claim 18, wherein the at least one parameter and the at least one alternative parameter each include a power control preamble duration and a signaling radio bearer delay.

20. The apparatus of claim 17, wherein the means for determining further determines the at least one alternative parameter at least in part by computing a fraction of the at least one parameter, wherein the at least one parameter relates to performing the power control procedure over the primary carrier.

21. The apparatus of claim 17, wherein the one or more parameters include a threshold number of transmit power control (TPC) bit indicators received in a number of TPC slots that indicate the power balance, and wherein the means for performing the power control procedure terminates the power control procedure for the secondary carrier in one or more subsequent frames based on detecting the power balance.

22. A non-transitory computer-readable medium storing computer executable code for performing power control over a secondary carrier, comprising:
   code executable to receive at least one parameter for performing power control over a primary carrier with a cell;
   code executable to determine, based on the at least one parameter, at least one alternative parameter for performing a power control procedure for a secondary carrier with the cell;
   code executable to perform the power control procedure for the secondary carrier with the cell based at least in part on the at least one alternative parameter; and
   code executable to determine the at least one alternative parameter at least in part by determining one or more parameters related to detecting a power balance in performing the power control procedure for the secondary carrier.

23. The computer-readable medium of claim 22, further comprising code executable to determine the at least one alternative parameter further based at least in part on receiving the at least one alternative parameter from the cell along with the at least one parameter, wherein the at least one parameter relates to performing the power control procedure over the primary carrier.

24. The computer-readable medium of claim 23, wherein the at least one parameter and the at least one alternative parameter each include a power control preamble duration and a signaling radio bearer delay.

25. The computer-readable medium of claim 22, further comprising code executable to determine the at least one alternative parameter further at least in part by computing a fraction of the at least one parameter, wherein the at least one parameter relates to performing the power control procedure over the primary carrier.

26. The computer-readable medium of claim 22, wherein the one or more parameters include a threshold number of transmit power control (TPC) bit indicators received in a number of TPC slots that indicate the power balance, and further comprising code executable to terminate the power control procedure for the secondary carrier in one or more subsequent frames based on detecting the power balance.

* * * * *